United States Patent
Suzuki

[11] Patent Number: 6,045,471
[45] Date of Patent: Apr. 4, 2000

[54] RATCHET TYPE TENSIONER WITH HYDRAULIC BUFFER MECHANISM

[75] Inventor: Tadasu Suzuki, Tokyo-to, Japan

[73] Assignee: Tsubakimoto Chain Co., Osaka, Japan

[21] Appl. No.: 09/048,743

[22] Filed: Mar. 26, 1998

[30] Foreign Application Priority Data

Mar. 31, 1997 [JP] Japan ..................... 9-081112

[51] Int. Cl.⁷ ........................... F16H 7/08; F16H 7/22
[52] U.S. Cl. ............................... 474/109; 474/110
[58] Field of Search ................... 474/101, 109, 474/110, 111, 113, 114, 115, 133, 134, 135, 136, 138

[56] References Cited

U.S. PATENT DOCUMENTS

| | | | |
|---|---|---|---|
| 4,881,927 | 11/1989 | Suzuki | 474/110 |
| 4,963,121 | 10/1990 | Himura et al. | 474/110 |
| 4,997,411 | 3/1991 | Breon et al. | 474/110 |
| 5,073,150 | 12/1991 | Shimaya | 474/110 |
| 5,352,159 | 10/1994 | Suzuki et al. | 474/110 |
| 5,370,584 | 12/1994 | Todd | 474/110 |
| 5,441,457 | 8/1995 | Tsutsumi et al. | 474/110 |
| 5,601,505 | 2/1997 | Tada | 474/110 |
| 5,720,684 | 2/1998 | Mott | 474/110 |
| 5,833,220 | 11/1998 | Nakakubo et al. | 474/110 |
| 5,842,943 | 12/1998 | Tada | 474/110 |
| 5,860,881 | 1/1999 | Tada | 474/110 |
| 5,879,256 | 3/1999 | Tada | 474/110 |

*Primary Examiner*—Tamara L. Graysay
*Assistant Examiner*—Matthew A. Kaness
*Attorney, Agent, or Firm*—Dann, Dorfman, Herrell and Skillman; Henry H. Skillman

[57] ABSTRACT

A ratchet type tensioner with a hydraulic buffer mechanism, which is simple in construction, low in manufacturing cost, easy in securing an oil path, and large in durability. A plunger (8) is slidably inserted into a plunger insert bore (9A) which axially extends through a plunger sleeve (9) restricted to advancing displacement by an anti-retrograde mechanism. A plunger spring (10) for biasing the plunger (8) forward is provided along with a sleeve spring (14) between a plunger housing (7) and the plunger sleeve (9) for biasing the plunger sleeve (8) forward. The sleeve spring (14) has a smaller spring constant than the plunger spring (10). A high pressure chamber (H) communicates with an oil pressure supply portion through a check valve (15). The chamber is formed in a space between a bottom portion of a plunger receiving bore (7B) in which the plunger (8) is inserted and a rear end surface (7C) of the plunger.

17 Claims, 6 Drawing Sheets

RATCHET TYPE TENSIONER WITH HYDRAULIC BUFFER MECHANISM

FIELD OF THE INVENTION

The present invention relates to a tensioner for applying tension to a transmission chain, and more particularly, to a tensioner into which is incorporated a hydraulic buffer mechanism.

BACKGROUND OF THE INVENTION

In a chain transmission apparatus used in the case where rotation of a crankshaft of the engine is transmitted to a cam shaft or the like, in general, a proper tension is applied to a chain by a tensioner to suppress vibrations generated in the chain during operation.

In a conventional tensioner, there is a ratchet type tensioner with a hydraulic buffer mechanism into which are incorporated a hydraulic check valve mechanism for buffering an excessive tension drastically exerted on the chain when operation starts or the like, and a ratchet mechanism for coping with an elongation which may result after a lapse of time in operation of the chain.

Figure 6A:
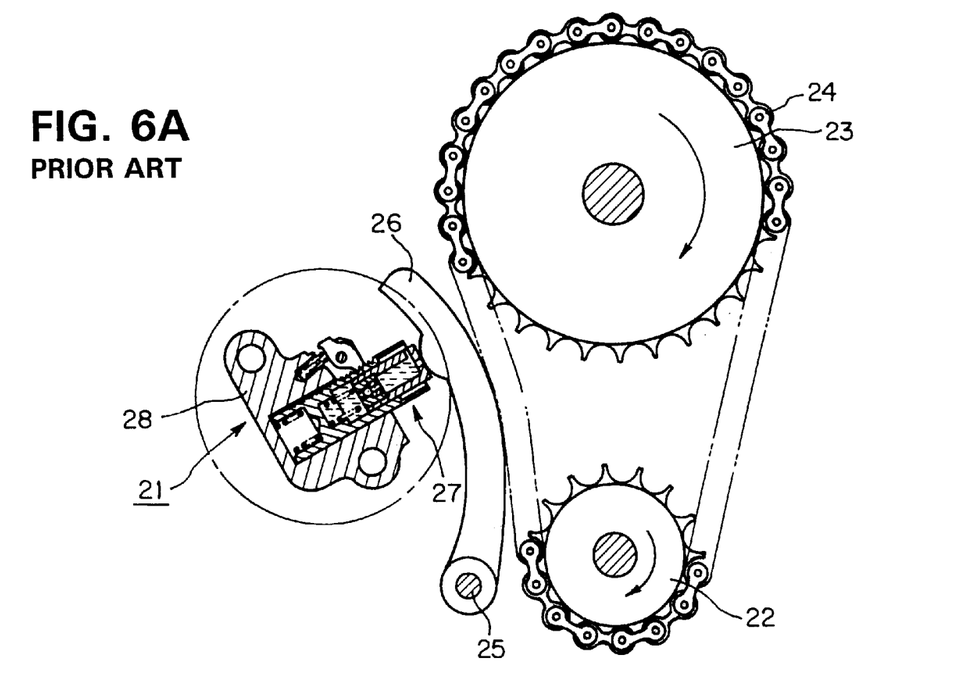
FIG. 6A is a sectional view showing one example of a conventional ratchet type tensioner with a hydraulic buffer mechanism.
Figure 6B:
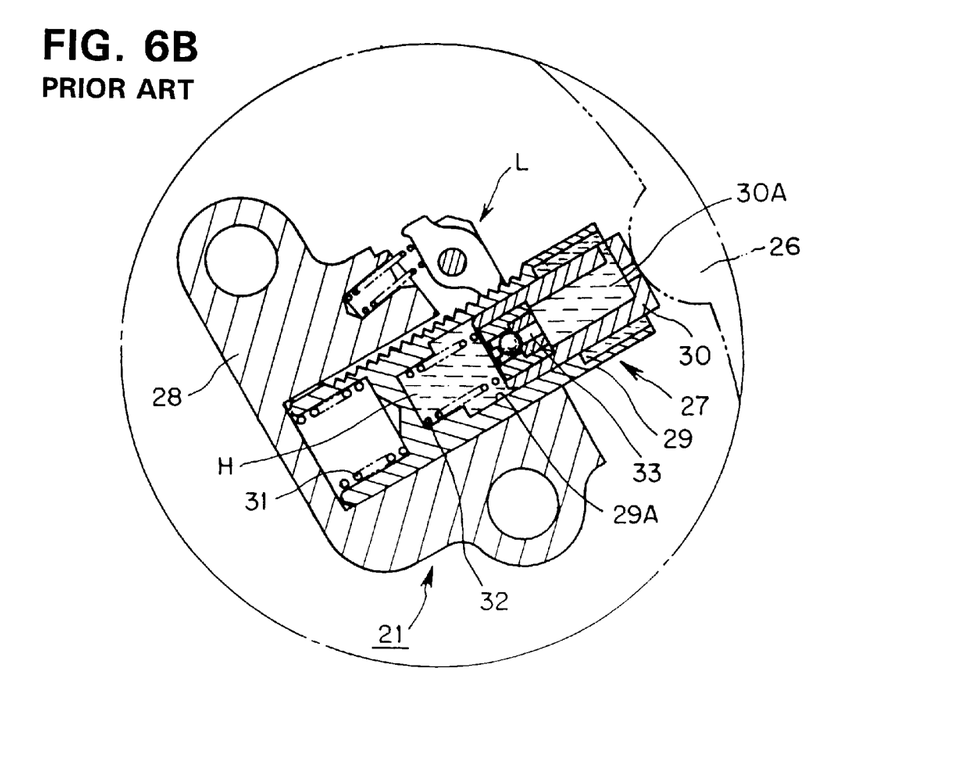
FIG. 6B is an enlargement of the portion of FIG. 6A which is encircled.

FIGS. 6A and 6B show one example of a ratchet type tensioner with a hydraulic buffer mechanism. A tensioner 21 is arranged, for use, in the vicinity of the upper end of a tensioner lever 26 having a lower end supported by a pivot shaft 25 and extending pivotally along the outer periphery on the slack run of a chain 24 stretched between a driving sprocket 22 and a driven sprocket 23. The tensioner 21 has a plunger 27 for pressing against the upper end of the tensioner lever 26 to apply tension to the chain 24 through the tensioner lever 26.

As shown in FIG. 6B, the plunger 27 comprises an outer plunger 29 held to be moved in and out of a plunger housing 28 and whose backward movement is controlled by a ratchet mechanism L, and an inner plunger 30 slidably inserted therein.

The outer plunger 29 is urged in a projecting direction with respect to the plunger housing 28 by a plunger spring 31, and the inner plunger 30 is urged in a projecting direction by an inner plunger spring 32 having a larger spring constant than the plunger spring 31, the inner plunger 30 being interiorly formed with an oil reservoir chamber 30A in communication with a high pressure chamber H through a check valve 33.

The check valve 33 prevents oil from flowing to the oil reservoir chamber 30A from the high pressure chamber H. When a shock load is exerted on the projecting end of the inner plunger 30 from the tensioner lever 26, oil filled in the high pressure chamber H leaks outside the high pressure chamber H through a restricted clearance provided by the slidable engagement between the inner peripheral surface of an inner plunger receiving bore 29A and the outer peripheral surface of the inner plunger 30 to buffer the shock load.

Figure 7A:
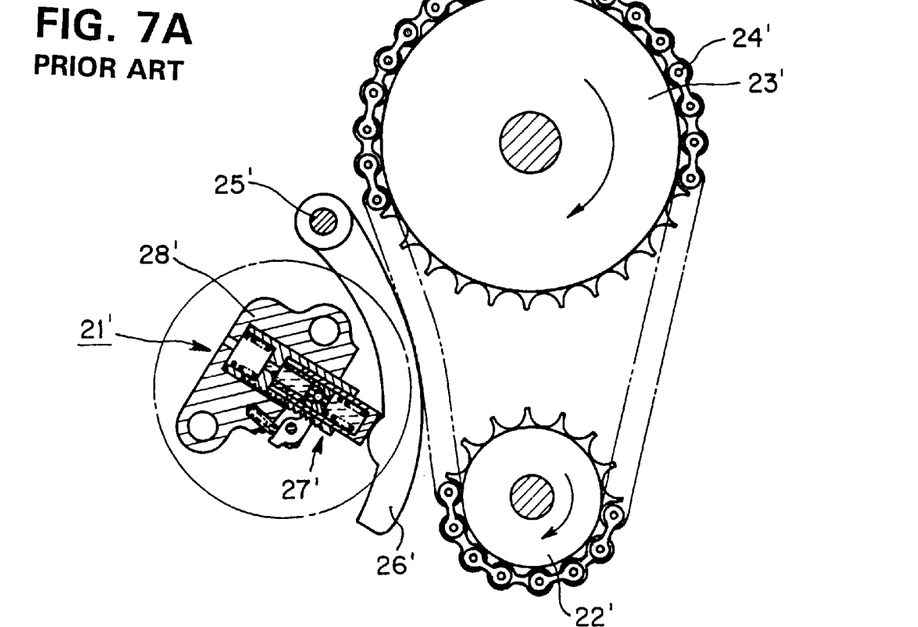
FIG. 7A is a sectional view showing another example of a conventional ratchet type tensioner with a hydraulic buffer mechanism.
Figure 7B:
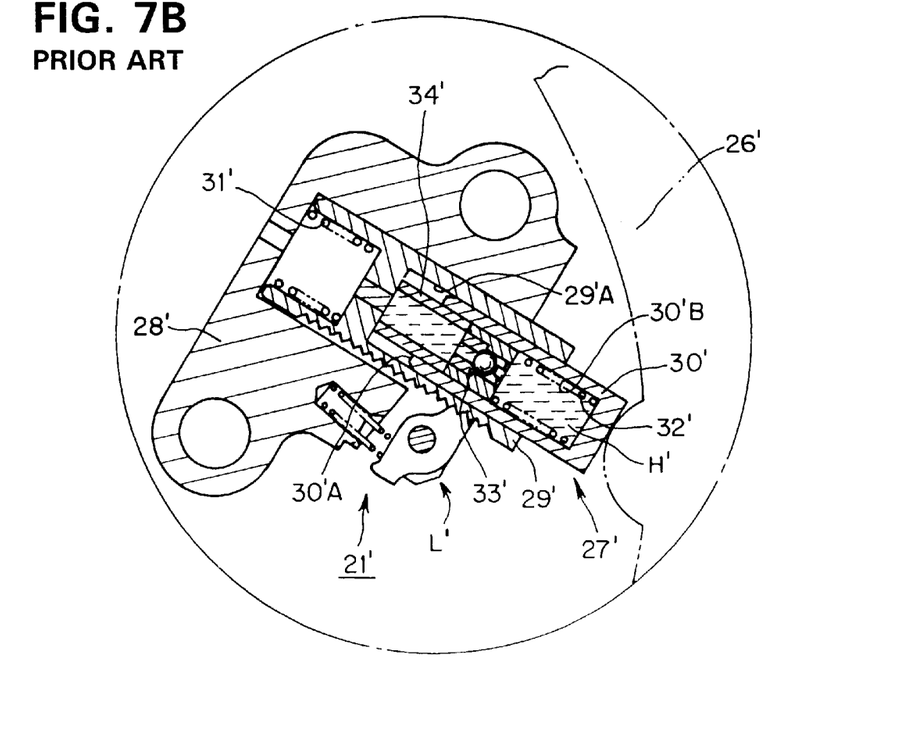
FIG. 7B is an enlargement of the portion of FIG. 7A which is encircled.

FIGS. 7A and 7B show a further example of a tensioner having a ratchet mechanism and a hydraulic valve mechanism. In this tensioner 21', a tensioner lever 26' is arranged along the outer periphery of the slack run of a chain 24' stretched between a driving sprocket 22' and a driven sprocket 23', as shown in FIG. 7A. The tensioner lever 26' has the upper end supported by a pivot shaft 25', and the tensioner 21' has an obliquely downwardly-directed plunger 27' for pressing against the lower end of the tensioner lever 26'.

As shown in FIG. 7B, the plunger 27' is composed of an outer plunger 29' and an inner plunger 30', similar to the plunger 27 of the tensioner 21 shown in FIGS. 6A and 6B, and is held to be moved in and out of a plunger housing 28'.

The outer plunger 29' is urged in a projecting direction by a plunger spring 31', and the backward movement thereof is prevented by a ratchet mechanism L'. Further, the inner plunger 30' has a closed-end tubular bore 30'B open at the opposite end to the bottom of an inner plunger receiving bore 29'A of the outer plunger 29'. Into the tubular bore 30'B are slidably inserted an inner plunger spring 32' having a larger spring constant than the plunger spring 31', a check valve plug 33', and a hollow sleeve 34' in sequence from the closed end to the opposite and in contact with one another.

In the tensioner 21', a high pressure chamber H' is formed between the bottom of the tubular bore 30'B and the check valve plug 33', an oil reservoir chamber is formed by a space within the hollow sleeve 34', and a check valve provided in the check valve plug 33' controls a flow of oil from the high pressure chamber H' to the oil reservoir chamber.

When a shock load is exerted on the projecting end of the inner plunger 30' from the tensioner 26', oil filled in the high pressure chamber passes through a clearance between the inner peripheral surface of the tubular bore 30'B and the outer peripheral surface of the check valve plug 33' and leaks toward the oil reservoir chamber so as to buffer the shock load.

In the above-described tensioners shown in FIGS. 6 and 7, when an elongation occurs in the chain after operation for a long period of time, the outer plunger advances along with the inner plunger by the urging force of the plunger spring to prevent slack in the chain due to the elongation.

At that time, since a retractable stroke of the inner plunger is always limited to a given amount, the chain is not excessively loosened due to the retracting displacement of the inner plunger.

In the above-described tensioners shown in FIGS. 6 and 7, the outer plunger is interior of the inner plunger receiving bore, and the inner plunger spring is interior of both the outer plunger and the inner plunger. Therefore, there poses a problem in that the construction become complicated and the manufacturing cost is high. Further, since the high pressure chamber is formed within both the outer plunger and the inner plunger, it has been difficult to provide an oil path for introducing oil into the high pressure chamber to restore the oil passing through the clearance.

Further, when a shock load is exerted on the inner plunger from the chain run, the shock load is transmitted to the outer plunger through oil in the high pressure chamber. Therefore, a large load is applied to the ratchet mechanism which prevents the retraction of the outer plunger to possibly cause damage or early wear in the ratchet pawls and ratchet teeth constituting the ratchet mechanism.

SUMMARY OF THE INVENTION

From the foregoing, the present invention solves the problems noted above with respect to prior art, and has as its object to provide a ratchet-type tensioner with a hydraulic buffer mechanism, which is simple in construction, is low in manufacturing cost, provides an easy oil path, and has great durability.

For achieving the aforesaid object, in a first embodiment, the present invention provides a ratchet type tensioner with a hydraulic buffer mechanism comprising: a hollow tubular plunger sleeve formed with a plunger insert bore which extends axially therethrough; a plunger slidably fitted into said plunger insert bore with both ends projecting before and behind in an axial direction from said plunger sleeve; a plunger housing having a plunger sleeve receiving bore having the front open and into which said plunger sleeve is slidably inserted, and a closed-end plunger receiving bore formed as a continuation to the rear of said plunger sleeve and into which is slidably engaged a rear portion of the plunger projected from the rear end of the plunger sleeve inserted into said plunger sleeve receiving bore, a high pressure chamber being formed between a bottom surface of said plunger receiving bore and a rear end surface of the plunger; a check valve providing an oil path for communicating said high pressure chamber with an oil supply portion to allow a flow of oil only in one direction from said oil supply portion to the high pressure chamber; an anti-retrograde mechanism provided between said plunger housing and said plunger sleeve to allow only a forward displacement of the plunger sleeve with respect to the plunger housing; a plunger spring provided on the circumference of a portion of said plunger projecting from a front end of the plunger sleeve of said plunger to urge the plunger in a direction of projecting it forward from the plunger sleeve; and a sleeve spring provided between said plunger housing and said plunger sleeve and having a smaller spring constant than said plunger spring to urge the plunger sleeve forward, characterized in that when a shock load acts on the front end of the plunger, oil filled in the high pressure chamber leaks out of the chamber through a restricted clearance provided by the slidable engagement between the inner peripheral surface of the plunger receiving bore and the outer peripheral surface of the plunger to buffer said shock load.

In a second embodiment, the present invention provides a ratchet type tensioner with a hydraulic buffer mechanism comprising a hollow tubular plunger sleeve formed with a plunger insert bore which extends axially therethrough; a plunger slidably fitted into said plunger insert bore with both ends projecting before and behind in an axial direction from said plunger sleeve; a plunger housing having a plunger sleeve receiving bore having the front open and into which said plunger sleeve is slidably inserted, and a closed-end plunger receiving bore formed as a continuation to the rear of said plunger sleeve receiving bore and into which is slidably engaged a rear portion of the plunger projected from the rear end of the plunger sleeve inserted into said plunger sleeve receiving bore, a high pressure chamber being formed between a bottom surface of said plunger receiving bore and a rear end surface of the plunger; a check valve providing an oil path for communicating said high pressure chamber with an oil supply portion to allow a flow of oil in only one direction from said oil supply portion to the high pressure chamber; an anti-retrograde mechanism provided between said plunger housing and said plunger sleeve to allow only a forward displacement of the plunger sleeve with respect to the plunger housing; a plunger spring provided between said plunger housing and said plunger sleeve to urge the plunger in a direction of projecting it forward with respect to the plunger housing; and an engaging portion provided in said plunger in contact with a rear end surface of the plunger sleeve in a position in which after the plunger is projected a predetermined distance forwardly of the plunger sleeve, the engaging portion advances the plunger sleeve together with the plunger, characterized in that when a shock load acts on the front end of the plunger, oil filled in the high pressure chamber leaks out of the chamber through a restricted clearance provided by the slidable engagement between the inner peripheral surface of the plunger receiving bore and the outer peripheral surface of the plunger to buffer said shock load.

According to the first embodiment of the invention, the bias force of the sleeve spring is transmitted to the plunger through the plunger sleeve and the plunger spring, and the front end of the plunger presses against the back of the tensioner to apply tension to the chain. At this time, the force of the plunger spring is balanced with that of the sleeve spring.

In the case where the chain is extended due to the use for a long period of time, the reaction from the chain side applied to the front end of the plunger becomes weakened, and the plunger advances toward the plunger sleeve by the force of the plunger spring.

When the plunger advances even a little, the force of the plunger spring is unbalanced relative to the force of the sleeve spring, and the sleeve spring causes the plunger sleeve to advance and be displaced out of the plunger housing to the position where the force of the sleeve spring balances with that of the plunger spring. After the plunger sleeve has advanced to a new position, its backward movement is prevented by the anti-retrograde mechanism.

When the shock force is exerted from the chain on the front end of the plunger, e.g. when the chain starts or the like, the shock force is transmitted from the plunger to the plunger sleeve through the plunger spring but the backward displacement of the plunger sleeve is prevented by the anti-retrograde mechanism so that only the plunger starts to move back.

On the other hand, since oil filled in the high pressure chamber is prevent from being back-flown to the oil supply portion by the check valve, when the plunger tends to move back, pressure of oil in the high pressure chamber rapidly rises. As a result, oil in the high pressure chamber leaks out of a restricted clearance provided by the slidable engagement between the inner peripheral surface of the plunger receiving bore and the outer peripheral surface of the plunger, and the shock force is relieved or buffered by the flowing resistance of the oil.

Further, also in the case where the wheel base between the sprockets over which the chain is stretched increases for the reason of thermal expansion or the like so that the tension of the chain increases, oil in the high pressure chamber likewise leaks so that the plunger moves back and is displaced against the bias force of the plunger spring to prevent excessive force from being applied to the chain.

Further, according to the second embodiment of the invention, the front end of the plunger presses against the back of the tensioner lever by the force of the plunger spring to apply tension to the chain.

In the case where the chain is extended due to the use thereof for a long period of time, reaction from the chain side applied to the front end of the plunger becomes weakened. Therefore, the plunger advances through the plunger sleeve by the force of the plunger spring, but when the plunger projects a predetermined amount from the plunger sleeve, the engaging portion comes in contact with the rear end surface of the plunger sleeve, which then moves forward along with the plunger. After the plunger sleeve has advanced to a new position its backward movement is prevented by the anti-retrograde mechanism.

In the case where the shock force is exerted from the chain to the front end of the plunger or in the case where the tension of the chain increases, oil in the high pressure chamber leaks out of a restricted clearance provided by the slidable engagement between the inner peripheral surface of the plunger receiving bore and the outer peripheral surface of the plunger so that the plunger moves back to buffer the shock force and relieve the excessive tension, similarly to the first embodiment of the invention.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENTS

Figure 1A:
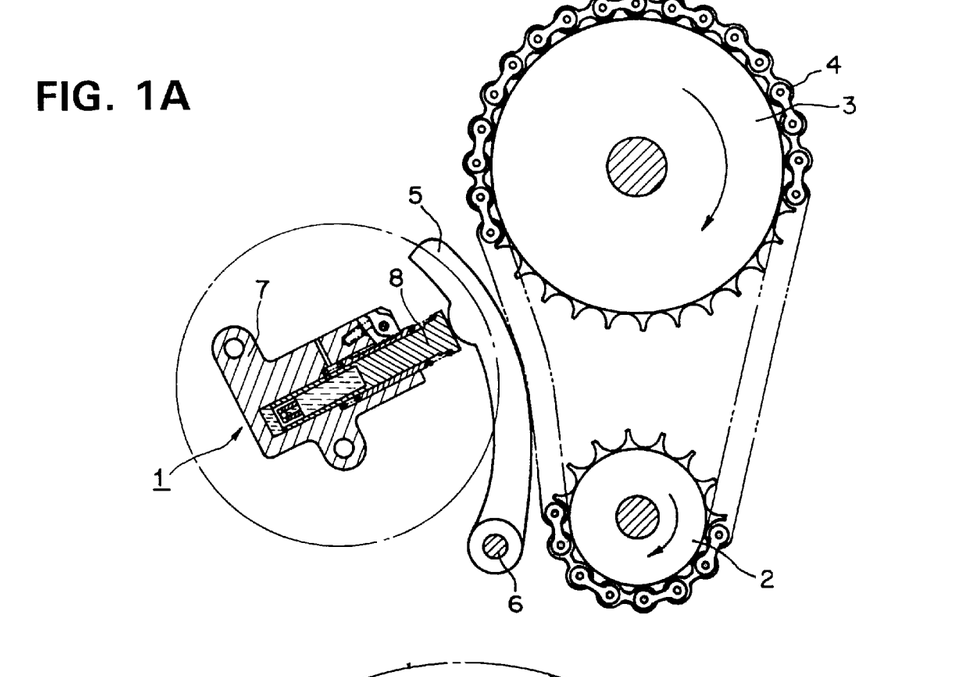
FIG. 1A is a sectional view showing a first embodiment of a ratchet type tensioner with a hydraulic buffer mechanism according to the present invention.
Figure 1B:
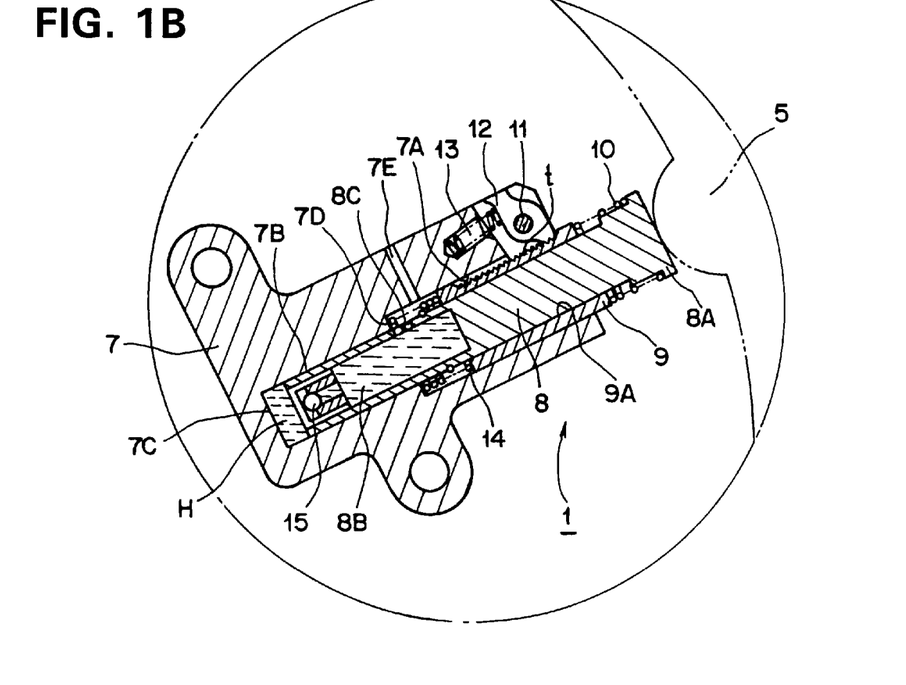
FIG. 1B is an enlargement of the portion of FIG. 1A which is encircled.

FIGS. 1A and 1B show one embodiment of a ratchet type tensioner with a hydraulic buffer mechanism. A tensioner 1 according to the present invention is combined, for use, with a tensioner lever 5 arranged along the outer side of the slack run of a chain 4 stretched between a driving sprocket 2 and a driven sprocket 3. The tensioner lever 5 has a lower end supported pivotally by a pivot shaft 6 and comes into sliding contact with the outside of the chain 4 by the urging of the tensioner 1 to apply tension thereto to prevent deflection during the running of the chain 4.

A plunger housing 7 of the tensioner 1 is provided with a plunger 8, to be moved in and out, into contact with the back of the tensioner lever to press and bias the latter against the outside of the slack run of the chain 4. The plunger 8 is slidably inserted into a plunger insert bore 9A which axially extends through a hollow tubular plunger sleeve 9, and a plunger spring 10 is mounted around a portion of the plunger sleeve 9 projecting from the front end. A compression coil spring is used for the plunger spring 10, which is held between a collar 8A formed on the front end portion of the plunger 8 and the front end surface of the plunger sleeve 9 to bias the plunger 8 in a forward direction projecting out from the plunger sleeve 9.

On the other hand, the plunger housing 7 is formed with a plunger sleeve receiving bore 7A whose front part is open, and the plunger sleeve 9 is slidably inserted thereinto. As a continuation of the rear portion of the plunger sleeve receiving bore 7A, a closed-end plunger receiving bore 7B is formed, into which is slidably inserted a rear portion of the plunger 8, projecting out from the rear end of the plunger sleeve 9. The slidable engagement between the rear portions of the plunger 8 and the interior surface of the plunger-receiving bore 7B provides a restricted clearance. A high pressure chamber H is formed in a space between a bottom surface 7C and the rear end surface of the plunger 8.

The outer peripheral surface of the plunger sleeve 9 is formed in a central part thereof with a number of ratchet teeth t in an axial direction thereof. A ratchet pawl 12 is rotatably supported on the plunger housing 7 by a shaft 11 and is meshed with the ratchet teeth t by the biasing force of the ratchet spring 13. The plunger sleeve 9 is restricted to forward displacement with respect to the plunger housing 7 by an anti-retrograde mechanism constituted by the ratchet teeth t, the shaft 11, the ratchet pawl 12, and the ratchet spring 13.

Further, an annular shoulder 7D is formed between the plunger sleeve receiving bore 7A formed in the plunger housing 7 and the plunger receiving bore 7B. A sleeve spring 14 for biasing the plunger sleeve 9 in the forward direction is provided between the annular shoulder 7D and the rear end surface of the plunger sleeve 9. The sleeve spring 14 has a smaller spring constant than the plunger spring 10. The natural length of the plunger spring is short as compared with that of the sleeve spring, and the displacement with respect to the same load is less for the plunger spring 10 than for the sleeve spring 14.

In the thus constructed tensioner 1, when tension exerted on the chain 4 increases during operation, the reaction force of the chain 4 applied to the front end of the plunger 8 through the tensioner lever 5 increases. Since the plunger sleeve 9 is prevented from backward movement by the anti-retrograde mechanism, only the plunger 8 moves back against the biasing force of the plunger spring 10 to prevent tension exerted on the chain 4 from becoming excessive.

In the case where there is extension of the chain 4 due to the use for a long period of time, and tension reduces, the reaction force from the chain 4 applied to the front end of the plunger 8 is reduced. Therefore, the plunger 8 advances toward the lever 5 by the force of the plunger spring 10. However, when the plunger 8 advances even a little, the plunger spring 10 is extended so that the force thereof becomes smaller than that of the sleeve spring 14. Therefore, the plunger sleeve 9 advances and is displaced with respect to the plunger housing 7 to a position where the forces of both the springs are balanced with each other, and the plunger sleeve 9 advances to a new position, after which the backward movement thereof is prevented by the anti-retrograde mechanism.

The retractable stroke against the biasing force of the plunger spring of the plunger 8 is limited to the compressible range of the plunger spring 10 irrespective of the projection of the plunger 8 forward from the plunger housing 7. In the case where a large tension is temporarily exerted on the chain 4, the plunger 8 can move back to the full extent of its retractable stroke, so as not to generate excessive slack in the chain 4.

On the other hand, in a rear half of the plunger 8, an oil reservoir chamber 8B is formed as an oil supply. The oil reservoir chamber 8B communicates with the interior of the high pressure chamber H through a check valve 15 incorporated in the rear end portion of the plunger 8. The check valve 15 is constituted so as to allow a flow of oil in only one direction from the oil reservoir chamber 8B to the high pressure chamber H, e.g. when the plunger 8 is moved forwardly to increase the size of the chamber H.

Further, the oil reservoir chamber 8B communicates with the outer peripheral surface of the plunger 8 by an oil port 8C, and is further communicated with an oil path 7E opening to the rear portion of the plunger sleeve receiving bore 7A of the plunger housing 7 so that oil can be supplied from the outside of the plunger housing 7 to the oil reservoir chamber 8B through the oil path 7E. The oil port 8C is open to the bore 7A in the normal operating range of the plunger 8.

Oil supplied into the oil reservoir chamber 8B from the outside passes through the check valve 15 to fill the high pressure chamber H with oil. However, since the tensioner 1 in the present embodiment is used in the attitude in which the oil reservoir chamber 8B is in a position higher than the high pressure chamber H, any bubbles mixed into oil in the oil reservoir chamber 8B move forwardly of the plunger 8 and do not migrate into the high pressure chamber H.

Since oil filled in the high pressure chamber H is prevented from back flowing toward the oil reservoir chamber 8B by the check valve 15, when tension is drastically applied to the chain 4 when the chain 4 starts or the like, and the reaction exerts as the shock force on the front end of the plunger 8 through the tensioner lever 5, pressure of oil within the high pressure chamber H rapidly rises.

As a result, the oil in the high pressure chamber H leaks outside of the high pressure chamber H through the restricted clearance between the inner peripheral surface of the plunger receiving bore 7B of the plunger housing and the outer peripheral surface of the plunger 8, and the energy of the shock force is consumed by the flowing resistance of oil which leaks through the clearance to obtain the buffer effect.

Figure 2A:
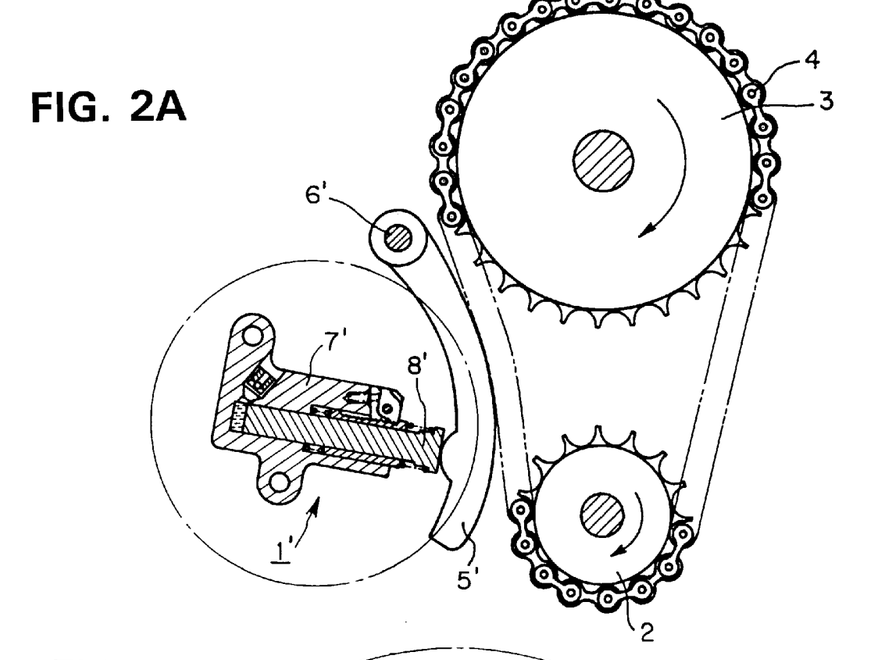
FIG. 2A is a sectional view showing a second embodiment of a ratchet type tensioner with a hydraulic buffer mechanism according to the present invention.
Figure 2B:
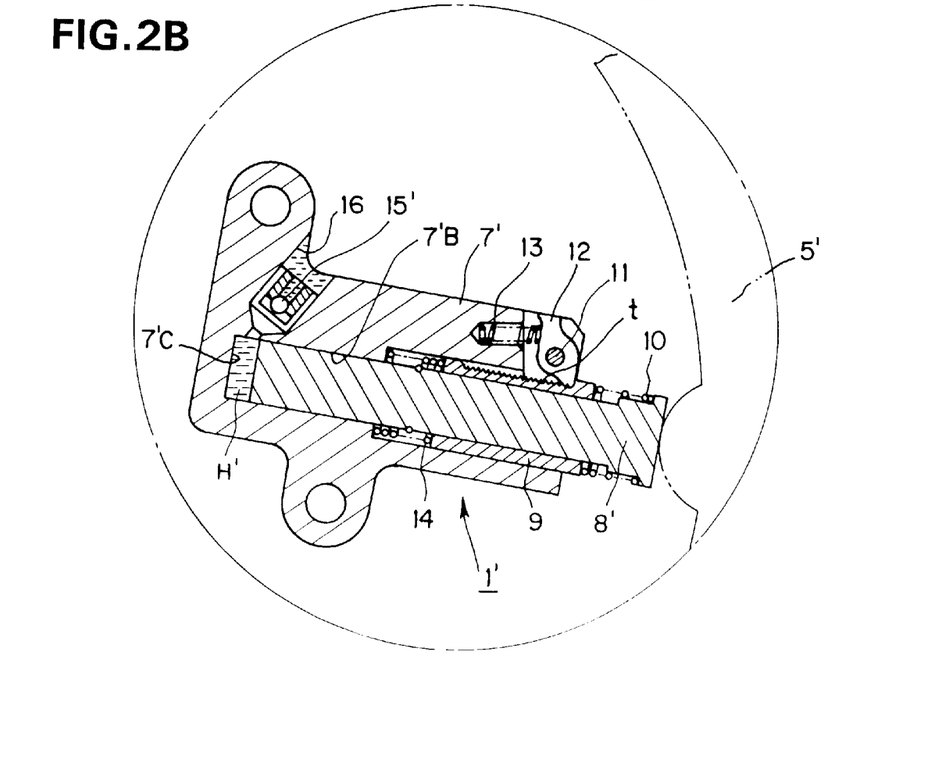
FIG. 2B is an enlargement of the portion of FIG. 2A which is encircled.

A second embodiment of the ratchet-type tensioner with a hydraulic buffer mechanism is shown in FIGS. 2A and 2B. The present embodiment is used in the case where a tensioner lever 5' has its upper end supported pivotally by means of a pivot shaft 6'. Springs and ratchet parts, indicated by the same numbers as those used in FIG. 1, are of the same configuration as in the tensioner 1 in the first embodiment, and these parts will not be described again.

In a tensioner 1' shown in FIG. 2, a high pressure chamber H' is formed in a space between a bottom surface 7'C of a plunger receiving bore 7'B of a plunger housing 7' and a rear end surface of a plunger 8', the chamber H' communicates with an oil reserve portion 16 in the upper portion at the rear of the plunger housing 7'. The oil reserve portion 16 comprises an oil supply open to the upper surface of the plunger housing 7' through a check valve 15'. The flow of oil in only one direction from the oil reservoir portion 16 to the high pressure chamber H' is allowed by the check valve 15'. The operation of the tensioner 1' is similar to that of the first embodiment shown in FIG. 1 except that oil to the high pressure chamber H' is supplied from the oil reservoir portion 16 formed in the plunger housing 7'.

In the aforementioned embodiments, a compression coil spring is used for the plunger spring 10, since a spring having a short spring length and a short spring constant is suited for the plunger spring 10. However, a plurality of spring washers or plate springs may be used one above another.

Figure 3:
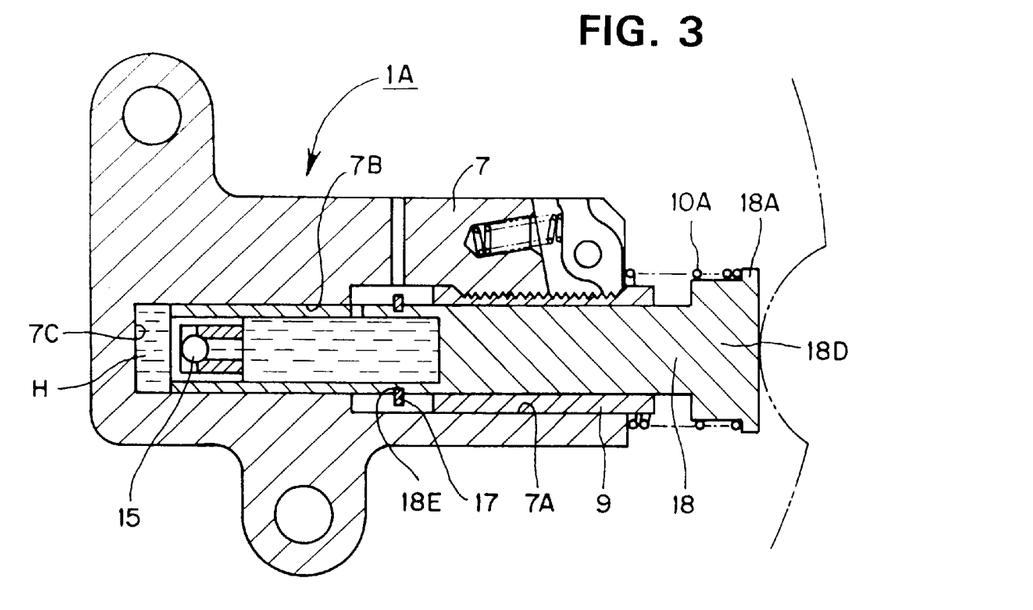
FIG. 3 is a sectional view showing a third embodiment of a ratchet type tensioner with a hydraulic buffer mechanism according to the present invention.

A third embodiment of a ratchet-type tensioner with a hydraulic buffer mechanism is shown in FIG. 3. Parts identified by the same numerals as those of FIG. 1 in FIG. 3 have the same configuration as those of the first embodiment. Referring to a tensioner 1A in this embodiment, whereas the tensioner 1 shown in FIG. 1 uses the plunger spring 10 and the sleeve spring 14, in the present embodiment, a plunger spring 10A is held between a collar 18A formed on the front end portion of the plunger 18 and the front surface of the plunger housing 7 to bias the plunger 18 in a forward direction projecting from the plunger housing 7.

In the plunger 18, the retracting and advancing stroke of the plunger with respect to the plunger sleeve 9 is limited by a large diameter portion 18D formed on the front end of the plunger 18 which engages the outside end of the sleeve 9 and by a stop ring 17 mounted as an engaging portion in an outer peripheral groove 18E formed in the outer peripheral surface of an axial intermediate portion which engages the interior end of the sleeve 9.

Therefore, the plunger sleeve 9 stands still with respect to the tensioner housing 7 till the plunger 18 projects forward so that the stop ring 17 comes in contact with the rear end surface of the plunger sleeve 9. When the plunger 18 further advances so that the stop ring 17 comes in contact with the rear end surface of the plunger sleeve 9, the plunger sleeve 9 is pressed by the stop ring 17 and advances along with the plunger 18.

After the plunger sleeve 9 has advanced to a new position, the backward movement thereof is prevented by the anti-retrograde mechanism. The anti-retrograde mechanism and other parts will not be explained because they are the same construction as in the tensioner 1 in the first embodiment.

Figure 4:
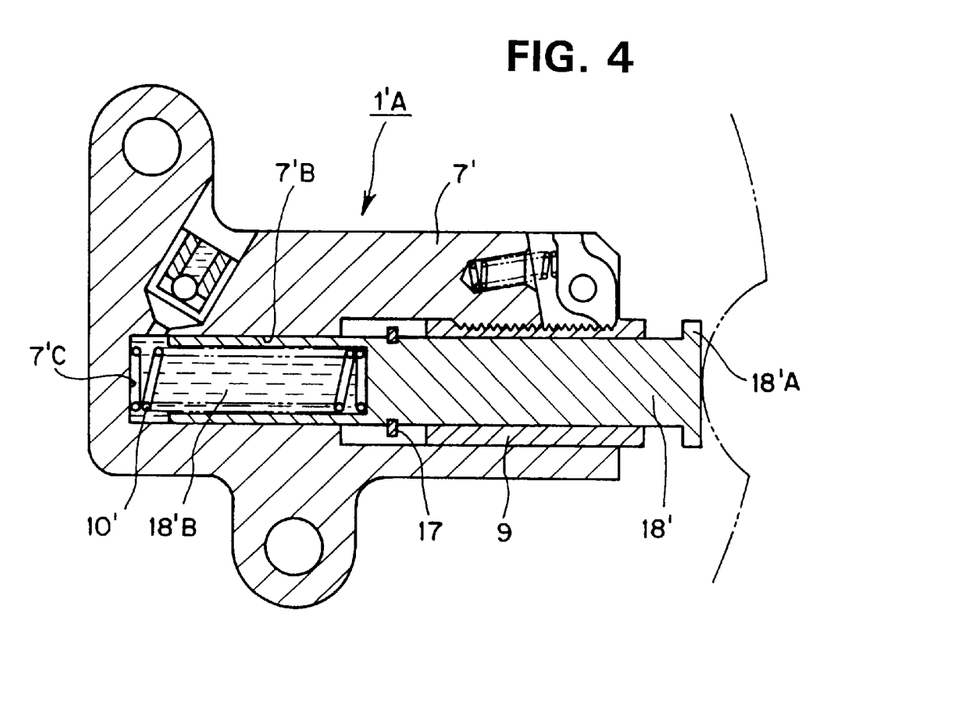
FIG. 4 is a sectional view showing a fourth embodiment of a ratchet type tensioner with a hydraulic buffer mechanism according to the present invention.

A fourth embodiment of the ratchet-type tensioner with a hydraulic buffer mechanism is shown in FIG. 4. A plunger 18' of a tensioner 1'A in the present embodiment is formed in its front end with a collar 18'A, and formed in its rear portion with a hollow portion 18'B open to the rear end and combining with the bottom 7'C to form a high pressure chamber.

In the tensioner 1' in the second embodiment, the plunger spring 10 and the sleeve spring 14 are used, whereas in the present embodiment, one plunger spring 10' is enclosed in the hollow portion 18'B, and the rear end of the plunger spring 10' comes in contact with a bottom surface 7'C of a plunger receiving bore 7'B to urge the plunger 18' forwardly.

Further, a stop ring 17 is mounted on the outer peripheral surface of the axial intermediate portion of the plunger 18' similarly to the ring 17 on the plunger 18 of the third embodiment. A slidable stroke of the plunger 18' with respect to the plunger sleeve 9 is limited by the stop ring 17 at the rear of the sleeve 9 and a collar 18'A at the front end, so that when the plunger 18' advances a predetermined length, the plunger sleeve 9 is engaged by the stopper ring 17 so as to advance together.

The plunger housing 7' and other parts will not be explained because they have the same configuration as in the tensioner 1' in the second embodiment.

Figure 5:
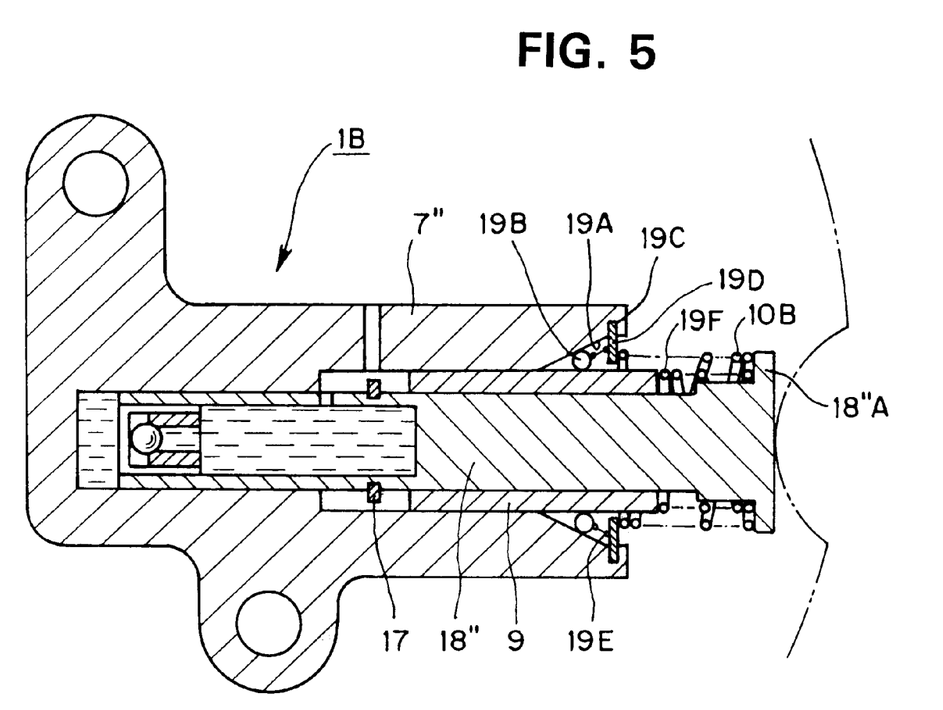
FIG. 5 is a sectional view showing a fifth embodiment of a ratchet type tensioner with a hydraulic buffer mechanism according to the present invention.

A fifth embodiment of the ratchet-type tensioner with a hydraulic buffer mechanism is shown in FIG. 5. In a tensioner 1B of the present embodiment, an anti-retrograde mechanism for preventing backward displacement of the plunger sleeve 9 with respect to a plunger housing 7" is composed a taper surface 19A formed in the front surface of the plunger housing 7". The surface diverges outwardly in the forward direction, and a plurality of balls 19B is arranged peripherally between the tapered surface 19A and the outer peripheral surface of the plunger sleeve 9. A small ball push spring 19E having a small spring force is arranged behind a spring receiving ring 19D having an outer peripheral edge engaged with and secured to an inner peripheral groove 19C formed in the vicinity of an opening of the taper surface 19A. The spring 19E biases the balls 19B toward the bottom of the tapered surface 19A.

In the anti-retrograde mechanism, when a plunger 18″ is advanced by the biasing force of a plunger spring 10B so that the stop ring 17 impinges upon the rear end of the plunger sleeve 9 and the plunger sleeve 9 is pressed forward, the balls 19B are displaced toward the diverging portion forwardly of the taper surface 19A against the biasing force of the ball push spring 19E, so as not to impair the forward movement of the plunger 18″ so that the latter, in turn, can advance with the plunger sleeve 9.

On the other hand, when the retreating force is exerted on the front end of the plunger 18″, the ball 19B pushed against both the taper surface 19A and the outer peripheral surface of the plunger sleeve by the ball push spring 19E. When the ball is moved between these surfaces, by the friction therebetween, it prevents the retreat of the plunger sleeve 9.

In the tensioner 1B in the present embodiment, parts other than the anti-retrograde mechanism are similar in construction to the tensioner 1A in the third embodiment shown in FIG. 3, and these parts will not be explained.

The anti-retrograde mechanism in the present embodiment has the merit of functioning steplessly as compared with that by way of the ratchet mechanism used in the aforementioned embodiments. However, since upon receipt of vibrations and shocks, the plunger sleeve 9 tends to advance, in this embodiment, a suppression spring 19F for biasing the plunger sleeve 9 backward is concentrically incorporated within the plunger spring 10B provided between a spring receiving ring 19D and a collar 18″A as shown in FIG. 5 to suppress the movement of the plunger sleeve 9 due to the vibrations.

Further, in the embodiments shown in FIGS. 3 to 5, in a position where the plunger projects a predetermined amount forwardly of the plunger sleeve, the plunger comes in contact with the rear end surface of the plunger sleeve to cause the plunger sleeve to advance together with the plunger. Therefore, the stop ring is used as the engaging portion. However, this is not a limitation. For example, a pin in contact with the rear end surface of the plunger sleeve may be provided to project to the outer peripheral surface of the plunger so that the former may be used as an engaging portion. Further, a collar or a difference in level which has the function similar to the stop ring may be formed in the outer peripheral surface of the plunger to use it as an engaging portion.

As described above, according to the ratchet type tensioner with a hydraulic buffer mechanism, the plunger is inserted into the hollow tubular plunger sleeve so as to project before and behind in an axial direction, and the anti-retrograde mechanism is provided between the plunger sleeve and the plunger housing. Therefore, the construction is simple, the processing of parts is facilitated, and the manufacturing cost of the tensioner can be reduced.

Further, since the high pressure chamber filled with oil is formed in a space between the bottom surface of the plunger receiving bore formed in the plunger housing and the rear end surface of the plunger, even if the excessive shock load is applied to the front end of the plunger, the shock load is not transmitted directly to the plunger sleeve, thus preventing damage to and early abrasion of the anti-retrograde mechanism. This enhances the durability of the tensioner.

Furthermore, since the high pressure chamber is not arranged internally of the plunger sleeve or the plunger, providing an oil path to the high pressure chamber is easy, and freedom of design in the arrangement of the oil path can be achieved.

While particular embodiments of the invention have been herein illustrated and described, it is not intended to limit the invention to such disclosures, but changes and modifications may be made therein and thereto within the scope of the following claims.

I claim:

1. A ratchet type tensioner with a hydraulic buffer mechanism comprising:

a hollow tubular plunger sleeve formed with a plunger-insert bore having a length which axially extends through said sleeve;

a plunger slidably fitted into said plunger-insert bore, said plunger being longer than said bore and having forward and rearward ends projecting from said plunger sleeve before and behind in an axial direction;

a plunger housing having a plunger sleeve-receiving bore, said sleeve-receiving bore having an open front end into which said plunger sleeve is slidably inserted, and a closed-end plunger-receiving bore formed as a continuation of said sleeve-receiving bore to the rear of said plunger sleeve, said plunger-receiving bore having an inner peripheral surface into which is slidably engaged said rearward end of the plunger, said slidable engagement providing a restricted clearance between said plunger-receiving bore and said rearward end of the plunger;

said closed-end plunger-receiving bore having a bottom surface, said bottom surface and said rearward end being spaced-apart forming a high pressure chamber therebetween;

an oil path for communicating said high pressure chamber with an oil supply including a check valve to allow a flow of oil in only one direction from said oil supply to the high pressure chamber;

an anti-retrograde mechanism provided between said plunger housing and said plunger sleeve to allow only a forward displacement of the plunger sleeve with respect to the plunger housing;

a plunger spring provided around the circumference of a forward portion of said plunger projected from a front end of the plunger sleeve to urge the plunger in a direction of projecting it forward from the plunger sleeve; and a sleeve spring provided between said plunger housing and said plunger sleeve and having a smaller spring constant than said plunger spring to urge the plunger sleeve forward, said restricted clearance between the inner peripheral surface of the plunger-receiving bore and the outer peripheral surface of the plunger operable when a shock load acts on the front end of the plunger, to allow oil filled in the high pressure chamber to leak out through said restricted clearance to buffer said shock load.

2. A tensioner according to claim 1, wherein said oil path includes an oil replenishment passage in said housing connected to said sleeve-receiving bore rearwardly of said sleeve, whereby said sleeve-receiving bore comprises an oil reservoir in said oil path, said restricted clearance allowing oil to leak from said chamber to said reservoir.

3. A tensioner according to claim 2 wherein said plunger has a hollow portion communicating with said reservoir, said check valve being positioned between said hollow portion and said rearward end of the plunger.

4. A tensioner according to claim 1 wherein said oil path includes an oil replenishment passage in said housing connected to said high pressure chamber and forming an oil reservoir in said oil path, said restricted clearance allowing oil to leak from said chamber to said reservoir.

5. A tensioner according to claim 4 wherein said check valve is positioned in said oil-replenishment passage between said reservoir and said chamber.

6. A ratchet type tensioner with a hydraulic buffer mechanism comprising:

a hollow tubular plunger sleeve formed with a plunger-insert bore having a length which axially extends through said sleeve;

a plunger slidably fitted into said plunger-insert bore, said plunger being longer than said bore and having forward and rearward ends projecting from said plunger sleeve before and behind in an axial direction;

a plunger housing having a plunger sleeve-receiving bore, said sleeve-receiving bore having an open front end into which said plunger sleeve is slidably inserted, and a closed-end plunger-receiving bore formed as a continuation of said sleeve-receiving bore to the rear of said plunger sleeve, said plunger-receiving bore having an inner peripheral surface into which is slidably engaged said rearward end of the plunger, said slidable engagement providing a restricted clearance between said plunger-receiving bore and said rearward end of the plunger;

said closed-end plunger-receiving bore having a bottom surface, said bottom surface and said rearward end being spaced apart forming an expandable high pressure chamber therebetween;

an oil path for communicating said high pressure chamber with an oil supply including a check valve to allow a flow of oil in only one direction from said oil supply to the high pressure chamber;

an anti-retrograde mechanism provided between said plunger housing and said plunger sleeve to allow only a forward displacement of the plunger sleeve with respect to the plunger housing;

a plunger spring provided to urge the plunger in a direction of projecting it forward with respect to the plunger housing; and an engaging portion provided in said rearward end of said plunger operable to contact a rear end of the plunger sleeve when the plunger projects a predetermined distance forwardly of the plunger sleeve to advance the plunger sleeve along with the plunger, said restricted clearance between the inner peripheral surface of the plunger-receiving bore and the outer peripheral surface of the plunger operable when a shock load acts on the front end of the plunger, to allow oil filled in the high pressure chamber to leak out through said restricted clearance to buffer said shock load.

7. A tensioner according to claim 6, said plunger spring seated at one end against said housing and seated at the opposite end against said plunger, said anti-retrograde mechanism comprising a ratchet on said sleeve and a pawl on said housing.

8. A tensioner according to claim 6, said plunger spring seated at one end against said housing and seated at the opposite end against said plunger, said anti-retrograde mechanism comprising a tapered surface in said housing surrounding said sleeve, a plurality of balls positioned between said sleeve and said tapered surface, spring means urging said balls rearwardly toward the smaller end of said tapered surface, and a suppression spring urging said sleeve rearwardly to maintain said balls engaged between said sleeve and said tapered surface to fix the position of said sleeve during normal operation of the tensioner, said sleeve being moved forwardly when said engaging portion engages the rear end of the plunger sleeve to advance the sleeve along with the plunger.

9. A tensioner according to claim 6, wherein said oil path includes an oil replenishment passage in said housing connected to said sleeve-receiving bore rearwardly of said sleeve, whereby said sleeve-receiving bore comprises an oil reservoir in said oil path, said restricted clearance allowing oil to leak from said chamber to said reservoir.

10. A tensioner according to claim 9 wherein said plunger has a hollow portion communicating with said reservoir, said check valve being positioned between said hollow portion and said rearward end of the plunger.

11. A tensioner according to claim 6 wherein said oil path includes an oil replenishment passage in said housing connected to said high pressure chamber and forming an oil reservoir in said oil path, said restricted clearance allowing oil to leak from said chamber to said reservoir.

12. A tensioner according to claim 11 wherein said check valve is positioned in said oil-replenishment passage between said reservoir and said chamber.

13. A ratchet type tensioner with a hydraulic buffer mechanism comprising:

a hollow tubular plunger sleeve formed with a plunger-insert bore having a length which axially extends through said sleeve;

a plunger slidably fitted into said plunger-insert bore, said plunger being longer than said bore and having forward and rearward ends projecting from said plunger sleeve before and behind in an axial direction;

a plunger housing having a plunger sleeve-receiving bore, said sleeve-receiving bore having an open front end into which said plunger sleeve is slidably inserted, and a closed-end plunger-receiving bore formed as a continuation of said sleeve-receiving bore to the rear of said plunger sleeve and into which is slidably engaged said rearward end of the plunger;

said closed-end plunger-receiving bore having a bottom surface, said bottom surface and said rearward end being spaced apart forming a high pressure chamber therebetween;

an oil path for communicating said high pressure chamber with an oil supply including an oil reservoir and a check valve between said reservoir and said chamber to allow a flow of oil in only one direction from said oil reservoir to the high pressure chamber to replenish said chamber when it expands;

a plunger spring to urge the plunger in a direction of projecting it forward from the plunger sleeve; and a sleeve spring to urge the plunger sleeve forward, an anti-retrograde mechanism provided between said plunger housing and said plunger sleeve to allow only a forward displacement of the plunger sleeve with respect to the plunger housing; and a restricted clearance bypassing said check valve and providing a restricted flow path from said chamber towards said reservoir, operable when a shock load acts on the front end of the plunger compressing said chamber, to allow oil filled in the high pressure chamber to leak out through said restricted flow path to buffer said shock load.

14. A tensioner according to claim 13, wherein said oil path includes an oil replenishment passage in said housing connected to said sleeve-receiving bore rearwardly of said sleeve, whereby said sleeve-receiving bore comprises an oil reservoir in said oil path, said restricted clearance allowing oil to leak from said chamber to said reservoir.

15. A tensioner according to claim 14 wherein said plunger has a hollow portion communicating with said reservoir, said check valve being positioned between said hollow portion and said rearward end of the plunger.

16. A tensioner according to claim 13 wherein said oil path includes an oil replenishment passage in said housing connected to said high pressure chamber and forming an oil reservoir in said oil path, said restricted clearance allowing oil to leak from said chamber to said reservoir.

17. A tensioner according to claim 16 wherein said check valve is positioned in said oil-replenishment passage between said reservoir and said chamber.

* * * * *